Patented Dec. 4, 1951

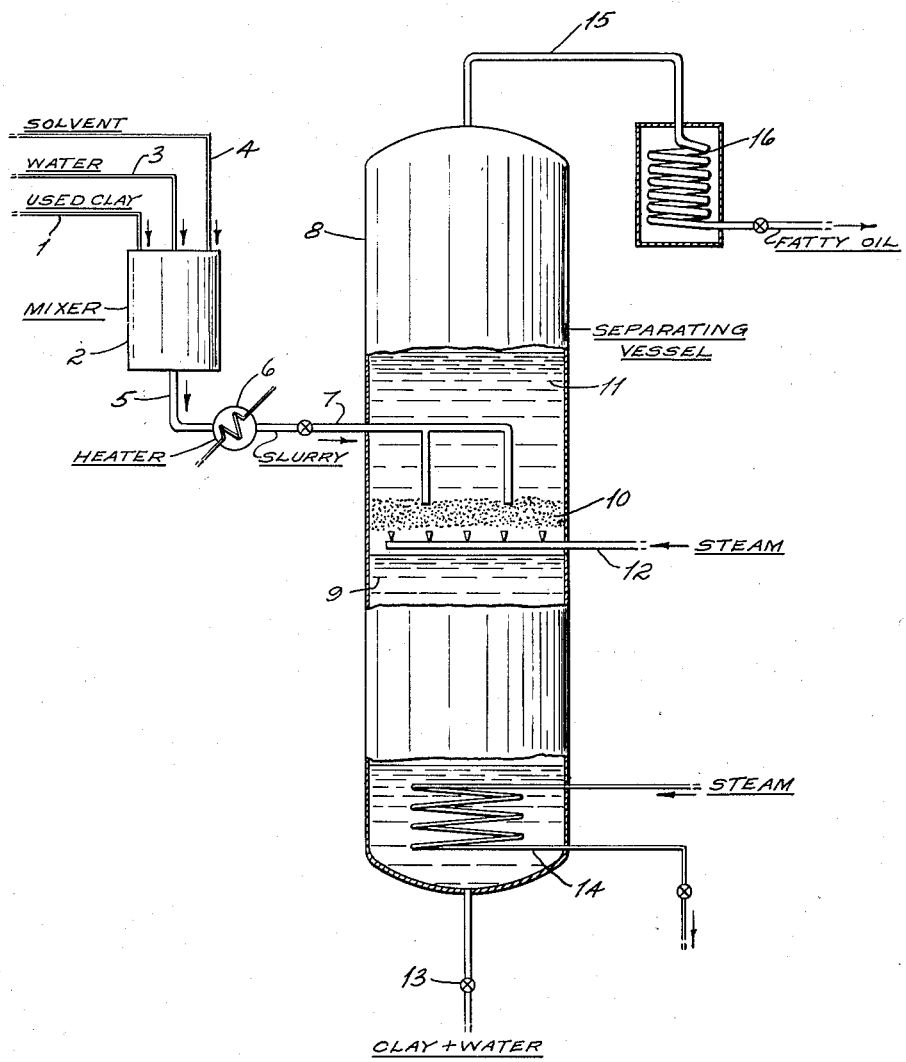

2,577,079

UNITED STATES PATENT OFFICE 2,577,079

SEPARATION OF FATTY OIL FROM SOLID BLEACHING AGENTS

William P. Gee, Plainfield, N. J., assignor to Texaco Development Corporation, New York, N. Y., a corporation of Delaware Application December 31, 1948, Serial No. 68,554

6 Claims. (Cl. 260—412.5)

This invention relates to the bleaching or decolorizing of fatty oil material by contact with solid adsorptive contact materials. It has particular application in the treatment of fatty oil materials such as derived from vegetable, fish, animal or other sources.

The present application is a continuation-in-part of my application Serial No. 734,260, filed March 12, 1947, now abandoned, for "Separation of Fatty Oil from Solid Bleaching Agents."

Vegetable, animal and marine oils, fats and waxes usually consist mainly of glycerides of fatty acids. The glycerides may be mono, di or tri-glycerides or mixtures thereof. Small amounts of free fatty acids and/or esters thereof may be present, also there may be present phosphatides, vitamins, etc.

In the refining of fatty oil materials of the foregoing type, it is frequently necessary to subject the material to contact with bleaching or decolorizing agents such as fuller's earth, decolorizing carbon or bone char, or other synthetic, manufactured, or naturally occurring adsorptive materials. The fatty oil material is subjected to contact with an adsorptive agent in finely divided form at elevated temperature, and the adsorptive agent is thereafter separated from the treated oil, usually by filtration. The used adsorbent, removed as a filter cake, retains some valuable fatty oil material, and this represents a loss of valuable material unless recovered.

The vegetable, animal or marine oil as the case may be, or any fraction thereof is subjected to treatment with the decolorizing earth. Thus, fractions rich in any one or more of the foregoing constituents of these oils, fats or waxes may be segregated from the crude oil and then treated with the decolorizing agent.

The present invention concerns a method for treating the filter cake so as to effect recovery of the valuable fatty oil material adhering to or absorbed in the solid particles of adsorbent material. It is particularly concerned with the recovery of adsorbed material which is substantially insoluble in water at temperatures of around 200° F. and which is of lower specific gravity than water or at least when diluted with a suitable water-immiscible solvent forms a solution of lower specific gravity than water at about the aforesaid temperature.

In accordance with this invention, the filter cake of decolorizing material containing oil usually is mixed with a small amount, an equal volume or less on the oil basis, of an organic solvent liquid capable of exerting solvent action upon the fatty oil material, and converted into a slurry which is then subjected to further treatment as will be described. A normally liquid naphtha hydrocarbon or a narrow fraction of a petroleum naphtha, such as a hexane fraction, is a suitable solvent. A small amount of "wetting" agent may also be used in combination with the above. In some cases it is not necessary to add such an organic solvent liquid as a diluent, in which case the oily decolorizing material may be introduced directly into the treating or separating system described below or it may be mixed with an aqueous liquid comprising water or water plus a small amount of organic solvent to form a slurry.

The resulting slurry, or oily decolorizing material, as the case may be, is introduced to an intermediate portion of a treating tower or system wherein an intermediate layer of such slurry or oily material is disposed between a lower layer of water and an upper layer of fatty oil material displaced from previously treated adsorbent, and diluted or not with an organic solvent, as the case may be. Steam is injected into the intermediate layer, advantageously in the region corresponding to the interface between the intermediate layer and the lower layer of water. Preferably, the steam is introduced through a plurality of sprays uniformly distributed over the horizontal cross section of the treating zone at approximately the level of the aforesaid interface. Although saturated steam is usually preferable, it is contemplated that steam superheated as much as 10 to 100° F., for example, may be used. The rate of saturated steam injection may amount to about 10 to 400 lbs. per hour per square foot of cross sectional area of the tower. The actual amount used depends upon such factors as the temperature at which the slurry enters the vessel, the amount of indirect heating supplied to the vessel and the physical characteristics of the clay particles and adsorbed material. Sufficient steam must be used to effect dispersion of the particles of solid adsorbent, and yet not prevent settling, so that the particles are selectively wetted with water, thereby facilitating displacement of the adhering fatty oil material from the particles of adsorbent.

The dispersed fatty oil material rises into the upper and supernatant layer of oil while the solid particles from which the fatty oil material has been displaced settles into the lower layer of water and collects in the bottom of the treating tower.

The settled particles and the displaced oil are separately removed from the lower and upper portions respectively, of the treating tower.

The presence of an organic solvent liquid, due to its solvent and diluting action upon the fatty oil material, aids in the separation and displacement of fatty oil from the solid particles. The organic solvent is advantageously a liquid which is more volatile than the fatty oil material so that it can be readily recovered from the fatty oil material by distillation. Examples of suitable solvents comprise suitable portions of petroleum naphtha, low boiling hydrocarbons or mixtures thereof, chlorinated hydrocarbons, ketones, such as acetone and methyl ethyl ketone, etc. The organic solvent may amount to an equal volume or less, based on the oil extracted, or from 0 to 30% of the aqueous liquid mixture in the event an aqueous mixture is used to form the slurry. The solvent liquid should be substantially completely miscible with the adsorbed material removed from the earth and substantially completely immiscible with the water at the temperature prevailing in the tower and should be of lower specific gravity than water, that is a specific gravity less than 1.0.

Reference will now be made to the accompanying drawing for a further description of the invention. In this description reference will be made to the treatment of a decolorizing clay which has been used to effect bleaching of a fatty oil such as derived from cotton seed. The used clay after separation from the treated fatty oil by filtration retains about 25 to 50% by weight of fatty oil.

As indicated in the drawing, this used clay is passed through a pipe 1 into a mixer 2 where a suitable diluent liquid is conducted through pipes 3 or 4 or both, into the mixer in the proportion of about 0.25 to 5 parts by weight per part of clay.

The resulting mixture in slurry form is conducted from the mixer through a pipe 5 to the heater or heat exchanger 6 wherein it is raised to a temperature of about 180 to 200° F. The resulting hot slurry is introduced through conduit 7 to a separating vessel 8 which may be maintained under pressure sufficient to maintain liquid phase conditions within the vessel.

As indicated in the drawing, the conduit 7 may terminate in a plurality of spouts within the vessel and arranged to dispose the slurry mixture in the form of a layer of liquid suspension in the intermediate section of the vessel.

The contents of the vessel 8 are regulated so as to maintain in the lower portion thereof an aqueous phase 9, comprising mainly water and substantially oil free clay.

The aforesaid disposed layer of slurry designated by the numeral 10 floats upon the aqueous phase 9. Above the intermediate layer 10 is an oil phase or layer 11, comprising fatty oil which has been separated from clay.

Supported in the intermediate section of the vessel 8 is a steam distributor 12 provided with a plurality of spray heads or atomizers through which steam is injected into the layer 10.

By controlling the valve 13 in the outlet pipe from the bottom of the vessel, the upper surface of the water layer 9 is maintained at or just below the steam distributor 12 so that the steam is injected into the layer 10 in the region of the interface between the layer 10 and the water layer 9.

The rate of slurry introduction through the conduit 7 is controlled to maintain the depth of the layer 10 within predetermined limits. Thus this layer may be maintained relatively shallow, for example ranging in depth from about 10 inches to 30 inches, while the upper and lower layers may each be at least several feet in depth.

The steam coil 14 is provided in the bottom portion of the vessel 8 to maintain the desired temperature conditions prevailing therein. It is desirable to maintain the intermediate layer 10 at a temperature of about 200 to 210° F.

As the oil is displaced from the solid particles in the intermediate layer 10, it rises into the upper part of the vessel 8, is continuously withdrawn therefrom through a pipe 15 and cooler 16.

In the event that an organic solvent liquid is used in forming the slurry, the oil phase drawn off through the cooler 16 will comprise oil and solvent liquid. The withdrawn oil phase in such case is subjected to distillation so as to strip the solvent from the fatty oil. The solvent free fatty oil may be separately disposed of but advantageously may be recycled to the initial operation wherein fresh fatty oil feed is subjected to contact treatment with clay. This recycling of the fatty oil material is advantageous, since it usually retains a small amount of the color bodies originally removed from the feed oil by the clay.

The wet clay is drawn off from the bottom of the vessel through the valve 13 as previously indicated. The withdrawn clay can be dewatered and reactivated for reuse by burning so as to remove color forming bodies or simply pumped away in slurry form.

The feed oil material undergoing decolorization or bleaching may include fatty oils, fatty acids, fatty waxes, glycerides, esters, etc. and mixtures of two or more of these classes of compounds obtained from vegetable, animal or marine oils, fats and waxes. It may comprise either saturated or unsaturated compounds or mixtures thereof. It may be either the crude oil or any fraction thereof.

The feed oil initially being decolorized may or may not be of lower specific gravity than water, and may or may not be completely immiscible with water but the adsorbed fatty materials or substances removed from the feed oil and thereafter recovered from the earth or clay by the process of this invention are of lower specific gravity than water or else form solutions in water-immiscible solvents that are of less specific gravity than water. They are also immiscible with or substantially completely immiscible with water under the conditions prevailing in the tower, involving a temperature of about 200 to 210° F. and substantially atmospheric pressure.

Obviously, many modifications and variations of the invention, as hereinbefore set forth, may be made without departing from the spirit and scope thereof, and therefore only such limitations should be imposed as are indicated in the appended claims.

I claim:

1. In the treatment of a fatty material of the class of fatty oils, fatty acids, fatty waxes, glycerides, fatty oil esters and fractions thereof with adsorbent earth in solid particle form, the used earth after separation from the treated substance retaining fatty material adhering thereto which is substantially completely immiscible with water and which is of lower specific gravity than water when dissolved in a substantially water-immiscible solvent of lower specific gravity than water, a continuous method of recovering said fatty material from the used earth which comprises forming a slurry of used earth and adhering fatty material in the presence of water, continuously passing a stream of resulting slurry to the intermediate portion of a substantially vertical treating zone maintained under pressure sufficient to maintain liquid phase conditions therein wherein an intermediate layer of introduced slurry is maintained between a lower layer of water and an upper layer of fatty material displaced from used earth, heating said intermediate layer by direct injection of steam thereto to about a temperature of 200 to 210° F. such that adhering fatty material separates from the solid particles and rises upwardly into said upper layer and solid particles from which fatty material has been separated become wetted and descend into said lower layer, and separately and continuously removing displaced material and solid particles from said traveling zone.

2. The method according to claim 1 in which the slurry is formed by mixing used earth and adsorbed fatty material with an aqueous liquid comprising water and a solvent liquid miscible with said adsorbed material, substanially immiscible with water and of lower specific gravity than water.

3. In the treatment of a fatty material of the class of fatty oils, fatty acids, fatty waxes, glycerides, fatty oil esters and fractions thereof with adsorbent earth in solid particle form, the used earth after separation from the treated substance retaining fatty material adhering thereto and substantially completely immiscible with water and which is of lower specific gravity than water when dissolved in a substantially water-immiscible solvent of lower specific gravity than water, a continuous method of recovering said fatty material from the used earth which comprises forming a slurry of used earth and adhering fatty material in the presence of water, continuously passing a stream of resulting slurry to the intermediate portion of a substantially vertical treating zone maintained under pressure sufficient to maintain liquid phase conditions therein wherein an intermediate layer of introduced slurry is maintained between a lower layer of water and an upper layer of fatty material displaced from used earth, injecting steam into said intermediate layer, maintaining said intermediate layer at a temperature of about 200 to 210° F. and such that adhering fatty material is displaced from said solid particles, and rises upwardly into said upper layer, and solid particles from which fatty material has been separated descend into said lower layer, and separately and continuously removing displaced fatty material and solid particles from said treating zone.

4. In the treatment of a fatty material of the class of fatty oils, fatty acids, fatty waxes, glycerides, fatty oil esters and fractions thereof with adsorbent earth in solid particle form, the used earth after separation from the treated substance retaining fatty material adhering thereto which is substantially completely immiscible with water and which is of lower specific gravity than water when dissolved in a substantially water-immiscible solvent of lower specific gravity than water, a continuous method of recovering said fatty material from the used earth which comprises forming a slurry of used earth and adhering fatty material in the presence of water, continuously passing a stream of resulting slurry to the intermediate portion of a substantially vertical treating zone maintained under a pressure sufficient to maintain liquid phase conditions therein wherein an intermediate layer of introduced slurry is maintained between a lower layer of water and an upper layer of fatty material, injecting steam into said intermediate layer uniformly over its horizontal cross section in the region of the interface between said intermediate layer and said lower layer of water, maintaining said intermediate layer at a temperature of about 200 to 210° F. and such that adhering fatty material is displaced from said solid particles, and rises upwardly into said upper layer, and solid particles from which fatty material has been separated descend into said lower layer, and separately and continuously removing displaced material and solid particles from said treating zone.

5. In the treatment of a fatty material of the class of fatty oils, fatty acids, fatty waxes, glycerides, fatty oil esters and fractions thereof with adsorbent earth in solid particle form, the used earth after separation from the treated substance retaining fatty material adhering thereto which is substantially completely immiscible with water and which is of lower specific gravity than water when dissolved in a substantially water-immiscible solvent of lower specific gravity than water, a continuous method of recovering said fatty material from the used earth which comprises forming a slurry of used earth and adhering fatty material in the presence of water and low boiling petroleum hydrocarbons, continuously passing resulting stream of slurry to the intermediate portion of a substantially vertical treating zone maintained under pressure sufficient to maintain substantially liquid phase conditions, and wherein an intermediate layer of introduced slurry is maintained between a lower layer of water and an upper layer of separated fatty material, injecting steam into said intermediate layer uniformly over its horizontal cross section in the region of the interface between said intermediate layer and said lower layer of water, maintaining said intermediate layer at a temperature of about 200 to 210° F. such that adhering fatty material is displaced from said solid particles and rises upwardly into said upper layer, and solid particles from which fatty oil material has been separated descend into said lower layer, and separately and continuously removing displaced fatty material and solid particles from said treating zone.

6. The method according to claim 5 in which the fatty material is derived from cottonseed oil.

WILLIAM P. GEE.

REFERENCES CITED

The following references are of record in the file of this patent:

UNITED STATES PATENTS

| Number | Name | Date |
|---|---|---|
| 619,020 | Henderson | Feb. 7, 1899 |
| 1,633,871 | Prutzman | June 28, 1927 |
| 1,827,165 | Pfaff | Oct. 13, 1931 |
| 2,006,088 | Mitchell | June 25, 1935 |
| 2,055,616 | Starr | Sept. 29, 1936 |
| 2,102,341 | Fuchs | Dec. 14, 1937 |